United States Patent [19]
Wolfe et al.

[11] Patent Number: 6,079,945
[45] Date of Patent: Jun. 27, 2000

[54] BRUSH SEAL FOR HIGH-PRESSURE ROTOR APPLICATIONS

[75] Inventors: Christopher Edward Wolfe, Niskayuna; Norman Arnold Turnquist, Cobleskill; Bharat Sampathkumar Bagepalli, Niskayuna, all of N.Y.

[73] Assignee: Geneal Electric Company, Schenectady, N.Y.

[21] Appl. No.: 08/967,640

[22] Filed: Nov. 10, 1997

[51] Int. Cl.[7] ............................. F01D 11/00; F16J 15/16
[52] U.S. Cl. .................. 415/231; 415/174.2; 415/174.5; 277/355
[58] Field of Search ............................. 415/173.3, 173.5, 415/174.2, 174.5, 230, 231; 277/355; 403/13, 14

[56] References Cited

U.S. PATENT DOCUMENTS

| | | |
|---|---|---|
| 4,564,232 | 1/1986 | Fujimori et al. ........................ 403/14 |
| 5,351,971 | 10/1994 | Short . |
| 5,474,305 | 12/1995 | Flower . |
| 5,480,160 | 1/1996 | Harms ..................................... 277/355 |
| 5,749,584 | 5/1998 | Skinner et al. ....................... 415/173.5 |

FOREIGN PATENT DOCUMENTS

| | | | |
|---|---|---|---|
| 1554164 | 1/1970 | Germany .................................. 403/13 |
| 2520996 | 10/1976 | Germany .................................. 403/14 |

OTHER PUBLICATIONS

U.S. application No. 08/672,665, filed on or about Jun. 28, 1996, 51DV–5613, "Brush Seals and Combined Labyrinth and Brush Seals for Rotary Machines,".

*Primary Examiner*—Christopher Verdier
*Attorney, Agent, or Firm*—Douglas Erickson; Marvin Snyder

[57] ABSTRACT

A brush seal, which may be used in gas or steam turbine rotor applications, includes a packet of bristles attached to a seal housing. A seal member is slideably-attached to the seal housing, has a planar first surface portion parallel to, and slideably in contact with, a first surface of the seal housing, and has a planar second surface portion which is parallel to, and slideably in contact with, a first side of the bristle packet. A mechanical spring is positioned in compression between the seal housing and the seal member.

9 Claims, 2 Drawing Sheets

BRUSH SEAL FOR HIGH-PRESSURE ROTOR APPLICATIONS

FIELD OF THE INVENTION

The present invention relates generally to brush seals, and more particularly to a brush seal for high-pressure applications involving rotating machinery.

BACKGROUND OF THE INVENTION

Brush seals are used to minimize leakage through a gap between two components, wherein such leakage is from a higher pressure area to a lower pressure area. Brush seals have been used, or their use proposed, in rotating machinery. Such use includes, but is not limited to, turbomachinery including steam turbines and gas turbines used for power generation and gas turbines used for aircraft and marine propulsion. It is noted that brush seals minimize the leakage of steam in steam turbines and minimize the leakage of compressed air or combustion gases in gas turbines.

A steam turbine has a steam path which typically includes, in serial-flow relationship, a steam inlet, a turbine, and a steam outlet. A gas turbine has a gas path which typically includes, in serial-flow relationship, an air intake (or inlet), a compressor, a combustor, a turbine, and a gas outlet (or exhaust nozzle). Gas or steam leakage, either out of the gas or steam path or into the gas or steam path, from an area of higher pressure to an area of lower pressure, is generally undesirable. For example, gas-path leakage in the turbine or compressor area of a gas turbine, between the rotating rotor shaft of the turbine or compressor and the circumferentially surrounding turbine or compressor casing, will lower the efficiency of the gas turbine leading to increased fuel costs. Also, steam-path leakage in the turbine area of a steam turbine, between the rotating shaft of the turbine and the circumferentially surrounding casing, will lower the efficiency of the steam turbine leading to increased fuel costs.

Conventional brush seal designs have been proposed for use in such applications. The brush seals have wire or ceramic bristles conventionally welded or otherwise affixed to a backing plate. To improve performance, such brush seals typically align their wire bristles to contact the rotating rotor shaft at an angle between generally forty-five and generally sixty degrees with respect to a radius line from the center of the rotor to the point of bristle contact. For high pressure applications, a seal plate is positioned against the seal bristles on the downstream side (i.e., lower-pressure side) of the brush seal. In one known application, an air pressure cavity floats the seal plate to prevent damage to the seal plate caused by contact with the rotor during transient radial excursions of the rotor.

What is needed is a brush seal which is responsive to transient radial excursions of a rotor while maintaining sealing in high-pressure rotor applications.

SUMMARY OF THE INVENTION

The brush seal of the invention includes a seal housing, a plurality of bristles defining a bristle packet, a seal member, and a mechanical spring. The seal housing has a first surface which is generally planar. The bristle packet has a fixed end which is attached to the seal housing, a free end which extends beyond the seal housing, and a first side which is generally planar and which is generally parallel to, and perpendicularly offset from, the first surface of the seal housing. The seal member is slideably-attached to the seal housing, the seal member has a first surface portion which is generally planar and which is generally parallel to, and slideably in contact with, the first surface of the seal housing, and the seal member has a second surface portion which is generally planar and which is generally parallel to, and slideably in contact with, the first side of the bristle packet. The mechanical spring is positioned in compression between the seal housing and the seal member.

Preferably, the brush seal is for generally sealing a leakage gap which extends radially between a rotor and a circumferentially-surrounding stator and which extends longitudinally between a higher pressure area and a lower pressure area. In this application, the seal housing is attached to the stator. Also, the first side of the bristle packet faces towards the lower pressure area and away from the higher pressure area, and the free end of the bristle packet extends towards, and makes contact with, the rotor.

Several benefits and advantages are derived from the invention. The seal member provides backing support to the bristles in high-pressure sealing applications. The seal member is slideably attached to the seal housing such that the seal member is pushed out of harm's way (instead of being damaged) by a rotor undergoing a radial excursion. In turbine applications, transient radial excursions of the rotor occur during changes in rotor speed, temperature, operating pressure, etc. and, especially in military aircraft engines, during abrupt changes in flight path. The mechanical spring quickly returns the seal member to its optimum location when the transient is over.

DETAILED DESCRIPTION OF THE INVENTION

Figure 1:
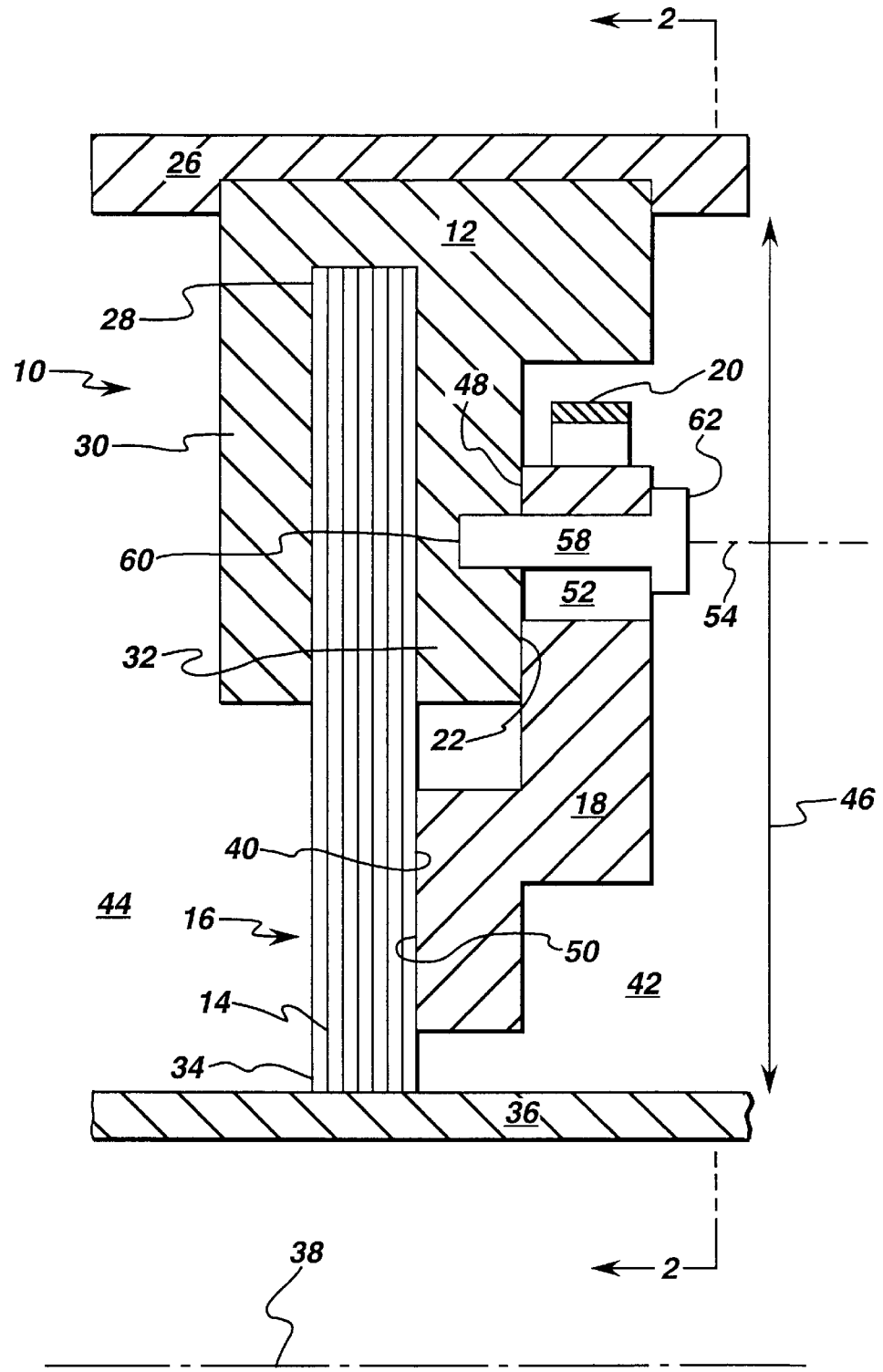
FIG. 1 is a schematic, cross-sectional view of a first preferred embodiment of the brush seal of the present invention installed in an exemplary turbine stator and rotor application, wherein the cross-sectional plane contains the longitudinal axis of the rotor.
Figure 2:
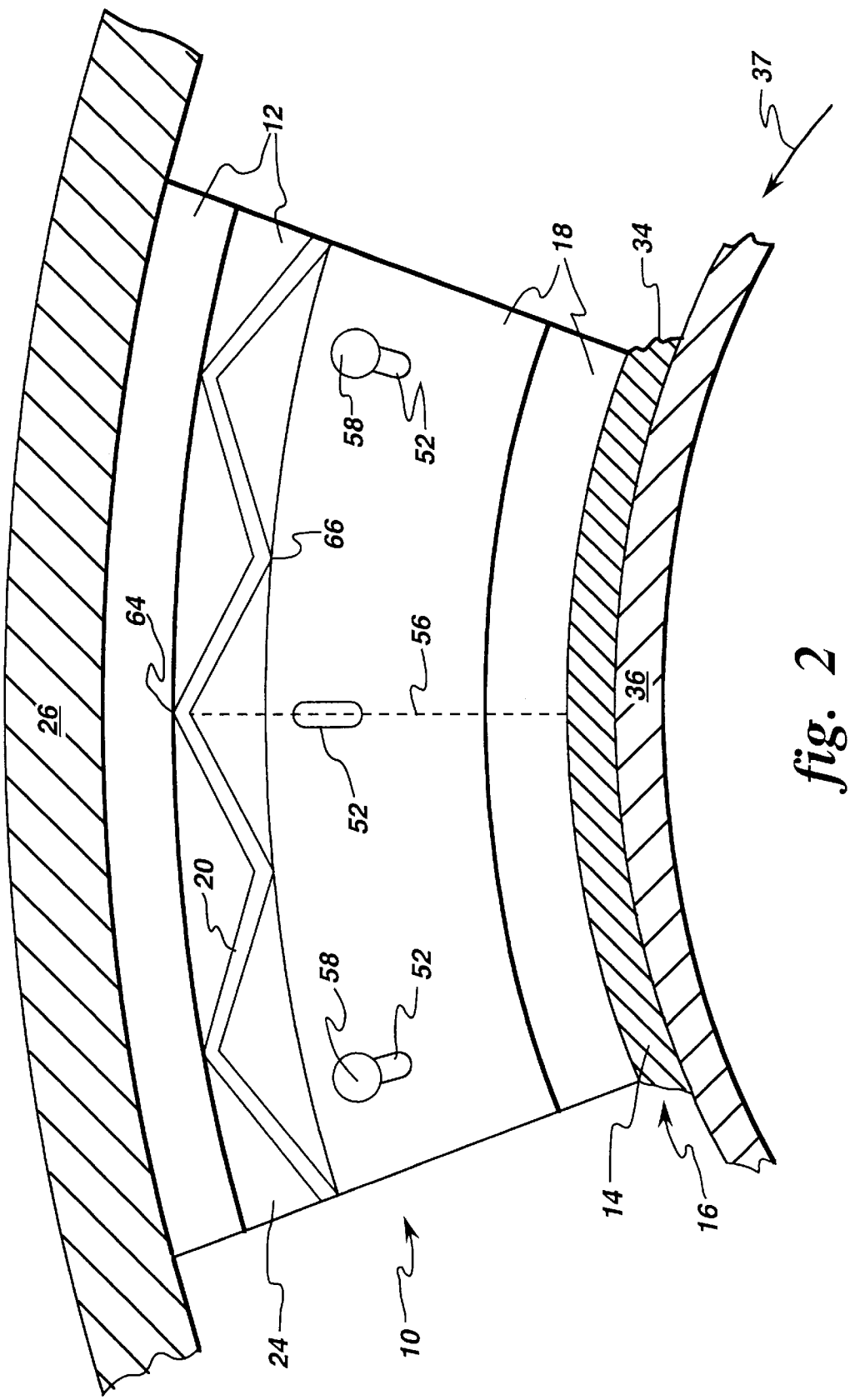
FIG. 2 is a sectional view, of the installed brush seal of FIG. 1, taken along arrows 2—2 of FIG. 1.

Referring now to the drawings, FIGS. 1–2 schematically show a first preferred embodiment of the brush seal 10 of the present invention. The brush seal 10 includes a seal housing 12, a plurality of bristles 14 defining a bristle packet 16, a seal member 18, and a mechanical spring 20. The seal housing 12 has a first surface 22 which is generally planar. The first surface 22 may otherwise have any shape such as, but not limited to, a rectangle, a complete annular ring, or, as shown in FIG. 2, a segment 24 of an annular ring. The brush seal 10 also includes generally-identical and circumferentially-spaced-apart additional seal housings with additional first surfaces having the shape of additional segments of the same annular ring, wherein the annular segment 24 and the additional annular segments are disposed in a circular array, such additional annular segments being omitted from the figures for clarity. Preferably, the seal housing 12 is attached (either directly or indirectly or monolithically) to a stator 26 (only a portion of which is shown in the figures). In an exemplary embodiment, the stator 26 is a turbine casing (and preferably a steam-turbine casing).

Preferred materials for the bristles 14 include, without limitation, coated or uncoated metal (including alloy) wire bristles and ceramic wire bristles. The bristle packet 16 has a fixed end 28 which is attached to the seal housing 12, such as by being welded (in the case of wire bristles 14) between front and back seal plate portions 30 and 32 of the seal housing 12, such plate portions 30 and 32 being attached (either directly or indirectly or monolithically) to the seal housing 12. In a preferred construction, the bristles 14 are generally identical. The bristle packet 16 also has a free end 34 which extends beyond the seal housing 12. Preferably, the free end 34 of the bristle packet 16 extends towards, and makes contact with, a rotor 36 which rotates in a first rotational direction 37 and which is circumferentially surrounded by the stator 26. In an exemplary embodiment, the rotor 36 is a turbine rotor (and preferably a steam-turbine rotor). The stator 26, the rotor 36, and the first surface 22 of the seal housing 12 are generally coaxially aligned about a common longitudinal axis 38. It is noted that the free end 34 of the bristle packet 16 extends radially inward of the seal housing 12. The bristle packet 16 additionally has a first side 40 which is generally planar and which is generally parallel to, and perpendicularly offset from, the first surface 22 of the seal housing 12. Preferably, the first side 40 of the bristle packet 16 faces longitudinally towards a lower pressure area 42 and longitudinally away from a higher pressure area 44. From the above discussion, it is seen that a preferred embodiment of the brush seal 10 is for generally sealing a leakage gap 46 which extends radially between a rotor 36 and a circumferentially-surrounding stator 26, which extends longitudinally between a higher pressure area 44 and a lower pressure area 42, and which preferably is a steam-leakage gap.

The seal member 18 is slideably-attached to the seal housing 12. The seal member 18 has a first surface portion 48 which is generally planar and which is generally parallel to, and slideably in contact with, the first surface 22 of the seal housing 12. The seal member 18 also has a second surface portion 50 which is generally planar and which is generally parallel to, and slideably in contact with, the first side 40 of the bristle packet 16. It is noted that the second surface portion 50 of the seal member 18 extends radially inward of the seal housing 12. The seal member 18 acts as a fence or fence plate, as can be appreciated by those skilled in the art. In a preferred construction, the seal member 18 has a multiplicity of spaced-apart, generally straight, and generally identical through slots 52 (three of which are shown in FIG. 2) which intersect the first surface portion 48 of the seal member 18. The through slots 52 have a longitudinal axis 54 aligned generally perpendicular to the first surface portion 48 of the seal member 18 and have a generally-elliptically-shaped cross section taken perpendicular to the longitudinal axis 54. It is noted that the longitudinal axis 54 of the through slots 52 is also aligned parallel to the common longitudinal axis 38 of the rotor 36, the stator 26, and the first surface 22 of the seal housing 12. The cross section (seen in FIG. 2) has a major axis and a minor axis, wherein the major axis is aligned generally parallel to a same reference line 56 for each of the through slots 52. Preferably, the reference line 56 extends in a fixed and generally radial direction.

The brush seal 10 also includes an equal multiplicity of pins 58 (only two of which are shown in FIG. 2) which are disposed one each in each of the through slots 52. The pins 58 are generally straight and are aligned generally parallel to the longitudinal axis 54. The pins 58 have a first end 60 attached (such as being threadably-attached) to the seal housing 12. The pins 58 also have a second end which is a generally-circular head 62, wherein the head 62 is disposed outside a corresponding one of the through slots 52, and wherein the head 62 has a diameter greater than the minor axis of the cross section of the through slots 52.

The mechanical spring 20 is disposed in compression between the seal housing 12 and the seal member 18. Preferably, the mechanical spring 20 is a leaf spring. In an exemplary construction, as seen in FIG. 2, the leaf spring has radially-outer bends 64 and radially-inner bends 66, wherein the radially-outer bends 64 are in contact with the seal housing 12, and wherein the radially-inner bends 66 are in contact with the seal member 18. The mechanical spring 20 may be retained in place, if required, by any suitable means (such as by a cover plate attached to the seal housing), as is within the purview of the artisan, such means being omitted from the figures for clarity.

From the above description of the brush seal 10 of the present invention, it is seen that the seal member 18 provides backing support to the bristles 14 in high-pressure sealing applications. It is noted that the seal member 18 is slideably attached to the seal housing 12 such that the seal member 18 is pushed out of harm's way (instead of being damaged) by a rotor 36 undergoing a radial excursion. In turbine applications, transient radial excursions of the rotor 36 occur during changes in rotor speed, temperature, operating pressure, etc. and, especially for military aircraft engines, during abrupt changes in flight path. The mechanical spring 20 quickly returns the seal member 18 to its optimum location when the transient is over. Thus, the brush seal 10 of the present invention allows a tighter clearance between the seal member 18 and the rotor 36 than the expected maximum radial excursion of the rotor 36. This enables use of the brush seal 10 in higher-pressure applications than would otherwise be possible.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A brush seal for generally sealing a leakage gap which extends radially between a rotor and a circumferentially-surrounding stator and which extends longitudinally between a higher pressure area and a lower pressure area, said brush seal comprising:

a) a seal housing attached to said stator and having a first surface which is generally planar;

b) a plurality of bristles defining a bristle packet, wherein said bristle packet has a fixed end which is attached to said seal housing, a free end which extends beyond said seal housing, and a first side which is generally planar and which is generally parallel to, and perpendicularly offset from, said first surface of said seal housing, wherein said first side of said bristle packet faces towards said lower pressure area and away from said higher pressure area, and wherein said free end of said bristle packet extends towards, and makes contact with, said rotor;

c) a seal member slideably-attached to said seal housing, wherein said seal member has a first surface portion which is generally planar and which is generally parallel to, and slideably in contact with, said first surface of said seal housing, and wherein said seal member has a second surface portion which is generally planar and which is generally parallel to, and slideably in contact with, said first side of said bristle packet; and d) a mechanical spring disposed in compression between said seal housing and said seal member, wherein the mechanical spring does not bias the seal member into contact with the rotor.

2. The brush seal of claim 1, wherein said seal member has a multiplicity of spaced-apart, generally straight, and generally identical through slots which intersect said first surface portion of said seal member, which have a longitudinal axis aligned generally perpendicular to said first surface portion of said seal member, and which have a generally-elliptically-shaped cross section taken perpendicular to said longitudinal axis; and also including an equal multiplicity of pins, wherein said pins are disposed one each in each of said through slots, wherein said pins are generally straight, wherein said pins are aligned generally parallel to said longitudinal axis, and wherein said pins have a first end attached to said seal housing.

3. The brush seal of claim 2, wherein said cross section has a major axis and a minor axis, and wherein said major axis is aligned generally parallel to a same reference line for each of said through slots.

4. The brush seal of claim 3, wherein said pins have a second end which is a generally-circular head, wherein said head is disposed outside a corresponding one of said through slots, and wherein said head has a diameter greater than said minor axis of said cross section.

5. The brush seal of claim 4, wherein said first surface of said seal housing is a segment of an annular ring, wherein said same reference line extends in a fixed and generally radial direction, and wherein said free end of said bristle packet and said second surface portion of said seal member extend radially inward of said seal housing.

6. The brush seal of claim 5, wherein said mechanical spring is a leaf spring having radially-outer bends and radially-inner bends, wherein said radially-outer bends are in contact with said seal housing, and wherein said radially-inner bends are in contact with said seal member.

7. The brush seal of claim 1, wherein said stator is a turbine casing and said rotor is a turbine rotor.

8. The brush seal of claim 7, wherein said leakage gap is a steam-leakage gap, wherein said turbine casing is a steam-turbine casing, and wherein said turbine rotor is a steam-turbine rotor.

9. A brush seal for generally sealing a leakage gap which extends radially between a rotor and a circumferentially-surrounding stator and which extends longitudinally between a higher pressure area and a lower pressure area, said brush seal comprising:

a) a seal housing attached to said stator and having a first surface which is generally planar;

b) a plurality of bristles defining a bristle packet, wherein said bristle packet has a fixed end which is attached to said seal housing, a free end which extends beyond said seal housing, and a first side which is generally planar and which is generally parallel to, and perpendicularly offset from, said first surface of said seal housing, wherein said first side of said bristle packet faces towards said lower pressure area and away from said higher pressure area, and wherein said free end of said bristle packet extends towards, and makes contact with, said rotor;

c) a seal member slideably-attached to said seal housing, wherein said seal member has a first surface portion which is generally planar and which is generally parallel to, and slideably in contact with, said first surface of said seal housing, and wherein said seal member has a second surface portion which is generally planar and which is generally parallel to, and slideably in contact with, said first side of said bristle packet; and d) a mechanical spring disposed in compression between said seal housing and said seal member, wherein the mechanical spring does not bias the seal member into contact with the rotor, wherein said seal member has a multiplicity of spaced-apart, generally straight, and generally identical through slots which intersect said first surface portion of said seal member, which have a longitudinal axis aligned generally perpendicular to said first surface portion of said seal member, and which have a generally-elliptically-shaped cross section taken perpendicular to said longitudinal axis; and also including an equal multiplicity of pins, wherein said pins are disposed one each in each of said through slots, wherein said pins are generally straight, wherein said pins are aligned generally parallel to said longitudinal axis, and wherein said pins have a first end attached to said seal housing, wherein said cross section has a major axis and a minor axis, and wherein said major axis is aligned generally parallel to a same reference line for each of said through slots, wherein said pins have a second end which is a generally-circular head, wherein said head is disposed outside a corresponding one of said through slots, and wherein said head has a diameter greater than said minor axis of said cross section, wherein said first surface of said seal housing is a segment of an annular ring, wherein said same reference line extends in a fixed and generally radial direction, and wherein said free end of said bristle packet and said second surface portion of said seal member extend radially inward of said seal housing, and wherein said mechanical spring is a leaf spring having radially-outer bends and radially-inner bends, wherein said radially-outer bends are in contact with said seal housing, and wherein said radially-inner bends are in contact with said seal member.

\* \* \* \* \*